US007384605B2

(12) United States Patent
Feldstein

(10) Patent No.: US 7,384,605 B2
(45) Date of Patent: Jun. 10, 2008

(54) FLUIDICS SYSTEM

(75) Inventor: Mark J. Feldstein, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 800 days.

(21) Appl. No.: 10/947,782

(22) Filed: Sep. 23, 2004

(65) Prior Publication Data

US 2006/0002823 A1 Jan. 5, 2006

Related U.S. Application Data

(62) Division of application No. 09/917,649, filed on Jul. 31, 2001.

(60) Provisional application No. 60/231,548, filed on Sep. 11, 2000.

(51) Int. Cl.
*B01L 3/02* (2006.01)
*B01L 11/00* (2006.01)
*B01L 3/00* (2006.01)
*G01N 1/22* (2006.01)

(52) U.S. Cl. ...................... 422/100; 422/102; 422/103; 436/180

(58) Field of Classification Search ................ 422/100, 422/102, 103
See application file for complete search history.

(56) References Cited

U.S. PATENT DOCUMENTS

| | | | | |
|---|---|---|---|---|
| 5,715,856 | A | 2/1998 | Martin et al. | |
| 5,726,404 | A | 3/1998 | Brody | |
| 5,849,486 | A | 12/1998 | Heller et al. | |
| 5,922,591 | A | 7/1999 | Anderson et al. | |
| 6,033,544 | A | 3/2000 | Demers et al. | |
| 6,068,978 | A | 5/2000 | Zaun et al. | |
| 6,137,117 | A | 10/2000 | Feldstein et al. | |
| 6,192,168 | B1 | 2/2001 | Feldstein et al. | |
| 6,743,399 | B1 * | 6/2004 | Weigl et al. | 422/102 |

OTHER PUBLICATIONS

Mark J. Feldstein, "Fluidics System," U.S. Appl. No. 09/917,649, filed Jul. 31, 2001.

Brody et al., "Biotechnology at Low Reynolds Numbers," Biophysical Journal, vol. 71, Dec. 1996, pp. 3430-3441.

Verlee et al, "Fluid Circuit Technology: Integrated Interconnect Technology for Miniature Fluidics Devices," 1996 Solid-State Sensor and Actuator Wrkshop, Jun. 3-6, 1996, 9-14.

Brody et al., "Low Reynolds Number Micro-Fluidic Devices," Solid-State and Actuator Workshop, Jun. 2-6, 1996, pp. 105-108.

Manz et al., "u-TAS: Miniaturized Total Chemical Analysis Systems," Micro Total Analysis Systems, Kluwer Academic Publishers, 1995, pp. 5-27.

(Continued)

*Primary Examiner*—Walter D. Griffin
*Assistant Examiner*—Lessanework T Seifu
(74) *Attorney, Agent, or Firm*—John J. Karasek; Stephen T. Hunnius

(57) ABSTRACT

The present invention provides a fluidics system and a method for selectively drawing fluid from at least one selected reservoir into a channel by providing a negative pressure source downstream of the fluid and channel and selectively back filling the selected reservoir with a gas.

17 Claims, 6 Drawing Sheets

OTHER PUBLICATIONS

Manz et al., "Planar Chips Technology for Miniaturization of Separation Systems: A Developing Perspective in Chemical Monitoring," Adv. in Chromotography, vol. 33, 1993, 1-66.

Bhatia et al., "Use of Thiol-Terminal Silanes and Heterobifunctional Crosslinkers for Immobilzation of Antibodies on Silica Surfaces," Anal. Biochemistry, 178, 1989, 408-413.

Feldstein et al, "Fluoriscence Array Biosensor Part 1: Optics and Fluidics," Micro Total Analysis Systmes '98, Proceedings of the uTAS '98 Workshop, Oct. 13-16, 1998, 431-433.

Rowe et al., "An Array Immunosensor for Simultaneous Detection of Clinical Analytes," Anal. Chem., vol. 71, No. 2, 1999, pp. 433-439.

Feldstein et al., "Array Biosensor: Optical and Fluidics Systems," Journal of Biomedical Microdevices, 1:2, 1999, pp. 139-153.

Rowe-Taitt et al., "Array biosensor for detection of biohazards," Biosensors & Bioelectronics, 14, 2000, pp. 785-794.

Dodson et al., "Fluidics Cube for Biosensor Miniaturization, Analytical Chemistry," Published on the Web, Jun. 2001.

* cited by examiner

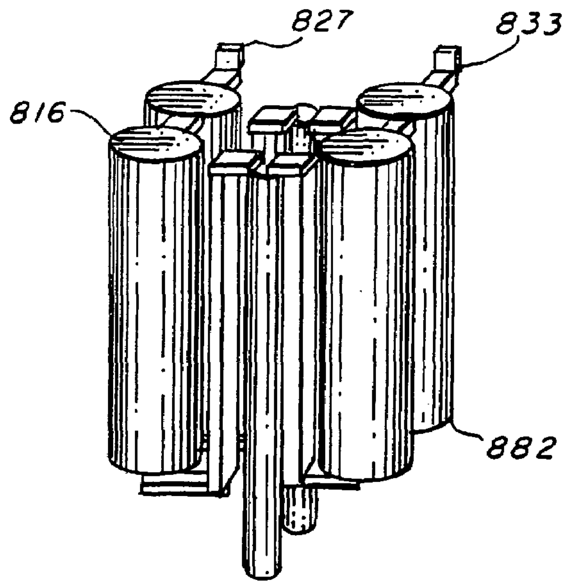
FIG. 8
FIG. 9
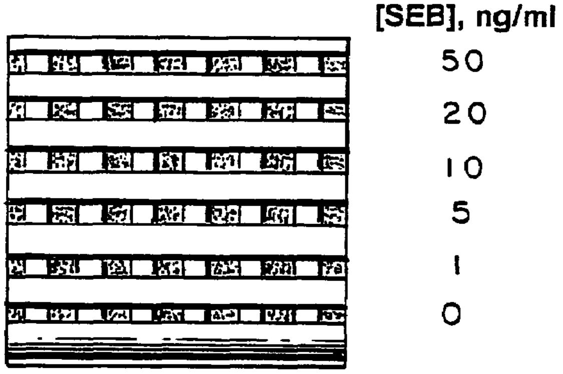
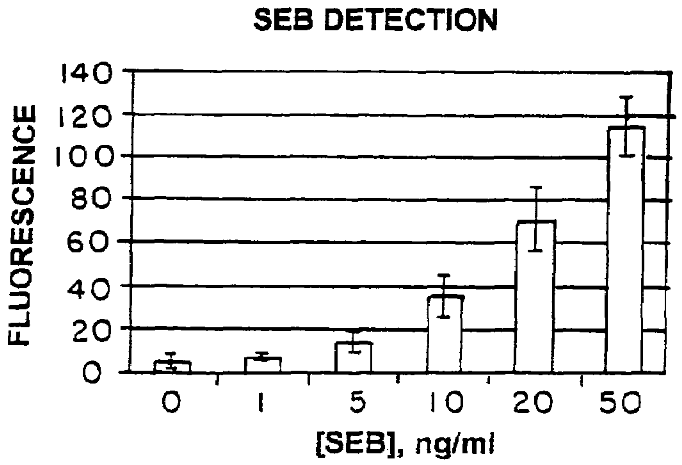
FIG. 10

FLUIDICS SYSTEM

This is a divisional application of copending application Ser. No. 09/917,649 filed on Jul. 31, 2001. The entire contents of application Ser. No. 09/917,649 are incorporated herein by reference.

This application claims the benefit of U.S. Provisional Application No. 60/231,548, filed on Sep. 11, 2000.

FIELD OF THE INVENTION

This invention relates to methods and systems of controlling fluid flow. This invention also relates to methods and systems of fluid flow control for sample analysis and methods, and systems of fluid flow control in portable fluidics systems.

BACKGROUND

Fluid control is necessary for many systems capable of automated chemical and biochemical analysis. These systems typically require liquid samples, reagents, and buffers to be dispensed in a controlled manner. Making these analysis systems portable presents unique demands on fluidics systems that have not been successfully met by currently available technology. These demands stem from the combined requirements of automation, compact size and compatibility with unprocessed samples, especially for field operations or point-of-care applications.

For laboratory-scale devices, there is an assortment of mechanical valves suitable for fluid handling and control. However, the size of these components makes them impractical for portable analysis systems. While small valves of analogous design have been developed and are commercially available, as the valve size is reduced, clogs by the components of complex sample matrices become an important limitation.

Micro-total analysis systems (F-TAS) perform integrated chemical analysis and fluid control on the micron scale. Many of these systems are capable of valveless fluid control by means of electrokinetic pumping and switch-driving pressures. (Manz, A. et al. in *Micro Total Analysis Systems*; and van den Berg, A. et al., Academic Publishers, *Dordrecht,* 1995, pp. 5-27). However, micron-scale channels can become clogged when unprocessed environmental and clinical samples are used. In addition, materials can be adsorbed onto channel walls and interfere with osmotic pumping. Furthermore, these devices have a relatively low-volume throughput making them impractical for the analysis of milliliter volumes, as may be required for accurate measurement of trace constituents or analysis of inhomogeneous samples.

The need for intermediate scale fluid handling systems has been identified. (VerLee, D. et al., *Technical Digest, Solid-State Sensor and Actuator Workshop,* 1996, pp. 9-14) Among the developments in this area are pneumatic diaphragm valves integrated directly into the device's fluidics channels. This approach provides fluid regulation while adding only slightly to the overall size of the system. However, diaphragm-based valves can suffer from sticking, clogging, and performance loss due to diaphragm aging.

Valveless fluid control has also been developed, thus eliminating the problem of valve clogging by suspended contaminants. For example, pressure control and pressure differentials can switch fluid flow between micro-channels. (Brody, J. P., 1998, U.S. Pat. No. 5,726,404) This method of fluid control is based on the application and regulation of differential pressures to each fluid channel and is only applicable in the low Reynolds number regime. The regulation of differential pressures makes the design inherently complex and, further, the requirement for pressure sources and regulators limits the feasibility of this method for portable instrumentation. The limitation with regard to the low Reynolds numbers regime makes the method impractical for the control of aqueous fluids in channels greater than approximately 100 microns. (Brody, J. P. et al., *Technical Digest, Solid-State Sensor and Actuator Workshop,* 1996, pp. 105-108; and Brody, J. P., *Biophysical Journal,* 1996, 71, pp. 3430-3441). Although valves may not be clogged with these approaches, the fluid channels themselves are likely to be clogged by suspended contaminants. Electrokinetic pumping and switching systems have also accomplished valveless fluid control in micron-scale devices. (Manz et al., *Advances in Chromatography,* 1993, 33, pp. 1-67.) Similarly, however, these designs are limited to the low Reynolds number regime, where micron-scale channels are prone to clogging. Further, these methods require large driving potentials, typically on the order of a kilovolt, and fluid flow that can be drastically affected by sample components adhering to the wall of the channel.

SUMMARY

According to certain embodiments, the present invention provides a fluidics system and a method for selectively drawing fluid from at least one reservoir into a channel by providing a negative pressure source downstream of the fluid and channel and simultaneously back filling the reservoir with a gas. For example, the present invention may comprise a fluidics system comprising an enclosed first reservoir having a first adjustable vent; an enclosed second reservoir having a second adjustable vent; a primary fluid channel; a first passageway for receiving a first fluid from the first reservoir and connected to the primary fluid channel; a second passageway for receiving a second fluid from the second reservoir and connected to the primary fluid channel; and a negative pressure source downstream of the primary fluid channel. The negative pressure source is configured for moving the first fluid but not the second fluid to the primary fluid channel when the first adjustable vent is not in a closed position and the second adjustable vent is in a closed position; for moving the second fluid but not the first fluid to the primary fluid channel when the second adjustable vent is not closed and the first adjustable vent is closed; and for moving the first and second fluids to the primary fluid channel when the first and second adjustable vents are not closed.

According to certain embodiments, the present invention provides a fluidics system and a method for selectively drawing fluid from at least one reservoir. The fluidics system may comprise a primary fluid channel comprising an input and an output; a first sealable reservoir comprising a first fluid output fluidically connected to the primary fluid channel input, and a first vent configured to selectively seal and unseal said first reservoir; a second sealable reservoir comprising a second fluid output fluidically connected to the primary fluid channel input, and a second vent configured to selectively seal and unseal said first reservoir; and a negative pressure source connected to the primary fluid channel output. The system can be configured to selectively draw at least one fluid from at least one of the first and second reservoirs into the primary fluid channel when the negative pressure source is activated and the respective reservoir is unsealed.

The present invention also involves a portable analysis system forconduction of biochemical and/or chemical analysis that contains a three-dimensional fluid circuit; a first enclosed reservoir having a first adjustable vent; a second enclosed reservoir having a second adjustable vent; a first passageway for receiving a first fluid from the first reservoir; a second passageway for receiving a second fluid from the second reservoir; a primary fluid channel; a first connecting channel connecting the first passageway to the primary channel; a second connecting channel connecting the second passageway to the primary channel; a multimode waveguide; a barrier configured to prevent fluid flow between the first and second connecting channels; and a negative pressure source downstream of the primary fluid channel. The first and second reservoirs and passageways are elements of the fluid circuit. The fluid circuit has elements and a series of layers and at least one of the elements is formed using molding techniques, and at least partial elements are formed by molding and mechanical, chemical, thermal and optical etching. Each layer of a series of layers is at least a partial element of the fluid circuit. The layers are fused together to form a complete element of the fluid circuit. The negative pressure source is configured for moving the first fluid but not the second fluid to the primary fluid channel when the first adjustable vent is not in a closed position and the second adjustable vent is in a closed position; for moving the second fluid but not the first fluid to the primary fluid channel when the second adjustable vent is not closed and the first adjustable vent is closed; and for moving the first and second fluids to the primary fluid channel when the first and second adjustable vents are not closed.

The present invention involves a method of performing a biochemical analysis, having the steps of moving a first fluid in a first reservoir having an adjustable first vent to a primary fluid channel when said first adjustable vent is not in a closed position and not moving a second fluid in a second reservoir having a second adjustable vent in a closed position when a negative pressure source is activated downstream of said primary fluid channel; and analysing a first fluid.

BRIEF DESCRIPTION OF THE INVENTION

The accompanying drawings, are incorporated in and constitute a part of this specification, and illustrate several embodiments of the invention.

FIG. 8 is a three-dimensional perspective view of a simplified two-sample reservoir, two-reagent reservoir fluidics system.

FIG. 9 shows an image of an analysis performed with a fluidics system.

FIG. 10 illustrates a summary of the analysis results from FIG. 9.

DESCRIPTION OF CERTAIN EMBODIMENTS

Reference will now be made in detail to certain embodiments of the invention, examples of which are illustrated in the accompanying drawings.

The section headings used herein are for organizational purposes only, and are not to be construed as limiting the subject matter described. All documents cited in this application, including, but not limited to, patents, patent applications, articles, books, and treatises, are expressly incorporated by reference in their entirety for any purpose.

Figure 1:
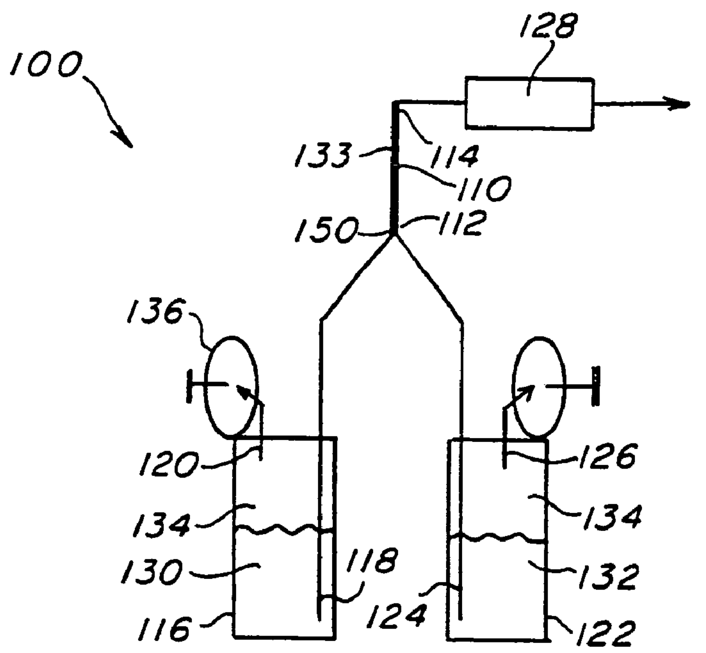
FIG. 1 is a schematic representation of a two-reservoir fluidics system according to the present invention.

According to certain embodiments, the present invention provides a fluidics system and a method for selectively drawing fluid from at least one reservoir. As shown in FIG. 1, a fluidics system 100 can include a primary fluid channel 110 having an input end 112 and an output end 114; a first enclosed and sealable reservoir 116 having a first fluid input duct 118 fluidically connected to the primary fluid channel input end 112, and a first vent 120 configured to selectively seal or unseal (open or close) the first reservoir; a second sealable and enclosed reservoir 122 having a second fluid input duct 124 fluidically connected to the primary fluid channel input end 112, and a second vent 126 configured to selectively seal or unseal (open or closed) the second reservoir; and a negative pressure source 128 connected to the primary fluid channel output end 114. The system can be configured to selectively draw at least one fluid, 130 or 132, from the first and/or second reservoir, 116 or 122. The fluid is drawn through the first or second input duct, passageways, 118 or 124, into the primary fluid channel, 110, when the negative pressure source, 128, is activated and the selected reservoir is unsealed by opening its vent, 120, 126. Gas can occupy space 134 above the fluids, 130, 132 within the reservoirs, 116, 122. The reservoir is enclosed except for an adjustable vent which can be associated with a valve, 136.

It should be understood that, as used herein, “sealable”, “sealed”, “unsealed”, “open”, “opened”, “close”, and “closed” and grammatical variants thereof refer to the ability of a fluid to flow in or out of an element, such as a reservoir, or to the state of the vent that permits or prevents fluid flow. A fluidics element, such as a reservoir, is understood to be sealed when fluid can not readily flow out of the reservoir without, for example, creating a (at least partial) vacuum in the reservoir.

Figure 2:
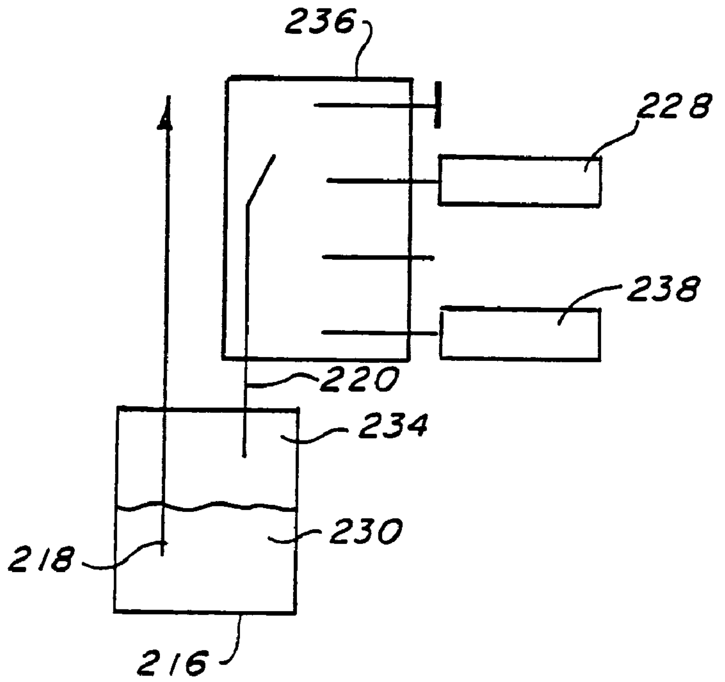
FIG. 2 is a schematic representation of a multi-positioned valve for connecting a reservoir to a given source.

For example, as shown in FIG. 2, reservoir 216 having a fluid 230, a gas space above the fluid, 234, an input fluid duct 218 and a vent 220 connected to a valve 236 that is sealed when the valve 236 is closed. As discussed further below, the reservoir 216 can also be in a sealed position when it is connected, via, for example, by the vent 220 and valve 236, to a negative pressure source 228. The reservoir 216 is unsealed when it is connected, via, for example, by the vent 220 and valve 236 to the atmosphere. As discussed further below, the reservoir 216 can also be in an unsealed (or vented) position when it is connected, via, for example, by the vent 220 and valve 236, to a positive pressure source 238.

According to certain embodiments, sealed and unsealed can be relative terms, when the sealed reservoir is connected to a relatively low pressure source, and the unsealed reservoir is connected to a relatively high pressure source. Further, as discussed below, a vent can be connected not only to pressure sources, but to additional fluid sources, such as an auxiliary fluid source, as well. Moreover, as discussed below, a single multi-positioned valve can be used to regulate the connection of multiple reservoirs or chambers.

It should be understood that, as used herein, the characterization of a pressure source as positive or negative is in reference to atmospheric pressure. Additionally, "negative" and "positive" can be considered relative terms when used together to differentiate between multiple pressure sources. For example, a negative pressure source is a pressure source that has or provides a pressure of less than atmospheric pressure or less than a positive pressure or provides a suction. A positive pressure source is a pressure source that has or provides a pressure of greater than atmospheric pressure or greater than a negative pressure. Atmospheric pressure (also understood to be a pressure source) is understood to be the local pressure of the atmosphere, and is not necessarily limited to standard atmospheric pressure, and can be either naturally occurring or artificially generated.

According to certain embodiments, the system can have multiple fluid channels, such as more than one primary and/or multiple secondary fluid channels, when a given primary fluid channel includes at least two secondary fluid channels. For example, the primary fluid channel can deliver fluid into a first and a second secondary fluid channel, each secondary channel having an input end and an output end or the secondary fluid channels can function as the primary fluid channel. The multiple fluid channels can be connected in serial fashion for serial fluid flow, in parallel fashion for parallel fluid flow, or any combination thereof, such that some of the multiple fluid channels are connected in parallel while others are connected in serial.

Figure 3:
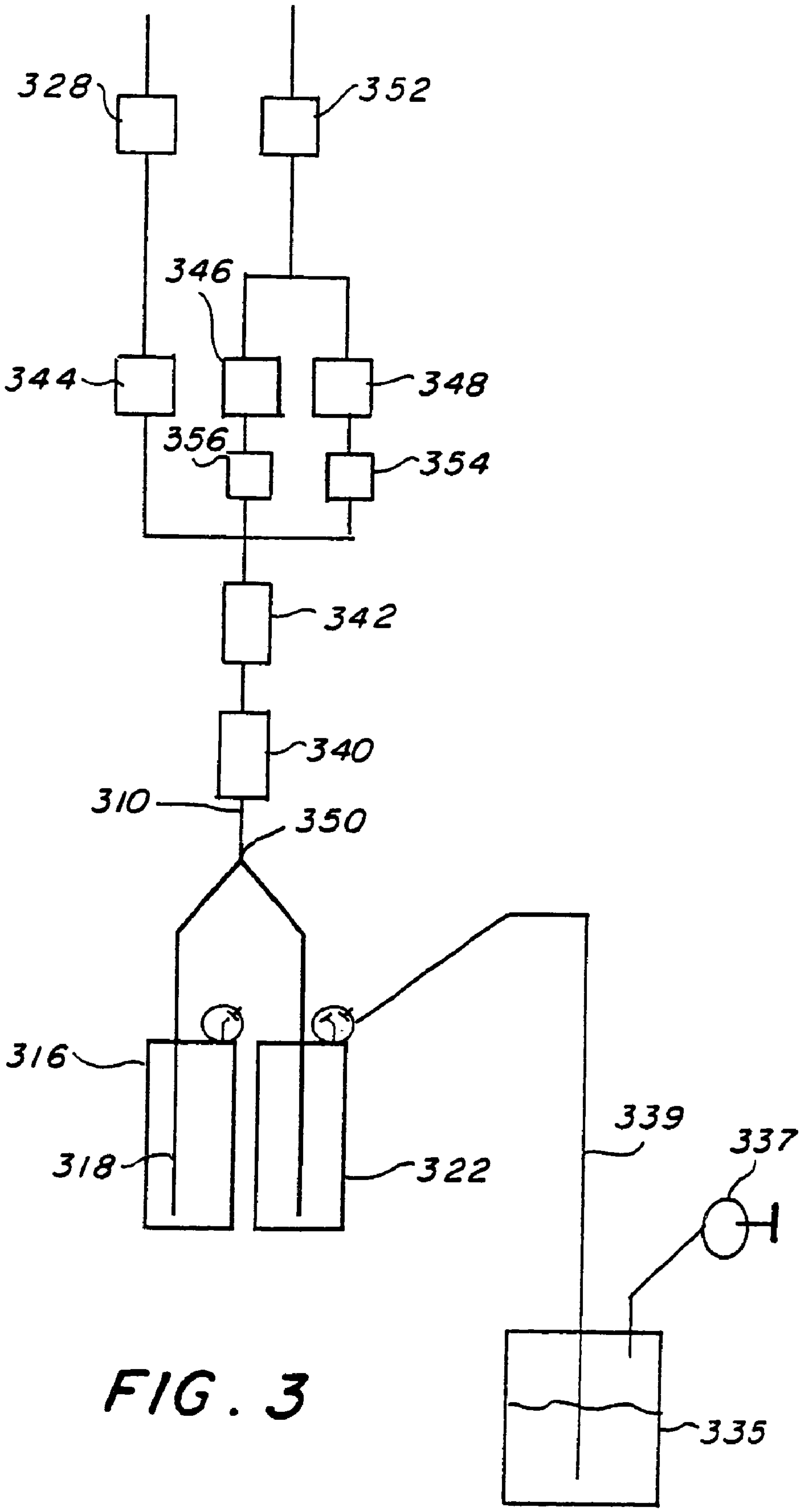
FIG. 3 is a schematic representation of a two-reservoir fluidics system with serial and parallel fluid channels, multiple negative pressure sources, and an auxiliary fluid reservoir.

For example, as shown in FIG. 3, the primary fluid channel 310 can be connected to secondary channels. The first 340 and second 342 fluid channels can be fluidically connected in series or the fluid channels 344, 346, 348 can be connected in parallel. The first 316 and second 322 reservoirs can be fluidically connected to input ends of the fluid channels. The connections can either be direct connection, or can be indirect, such as, for example, via a manifold 350, conduit, or other connection element.

According to certain embodiments, the system can be configured to selectively draw fluid from at least one of the first and second reservoirs into both the first and second secondary fluid channels when the negative pressure source is activated and the respective reservoir is unsealed. For example, in the case of fluid flow from the first reservoir, the first reservoir duct can be connected via a 1-2 manifold. The manifold connects to the output end of the first reservoir duct and, on the other end, connects to both the first and second primary fluid channels. According to certain embodiments, the inverse connection scheme, where two reservoirs are connected via a 2-1 manifold to a single fluid channel, is also possible. Thus, according to certain embodiments, the system can further include a manifold, to connect the output ends of the first and second secondary fluid channels to the negative pressure source. The manifold is not limited to 1-2 or 2-1 manifold, but can include any number of input and output connections.

According to certain embodiments, including, for example, embodiments containing multiple primary and/or secondary fluid channels, the negative pressure source can include multiple negative pressure sources. For example, as shown in FIG. 3, the negative pressure source can contain first 328 and second 352 negative pressure sources. The first 328 and second 352 negative pressure sources can be connected, for example, to the output ends of the fluid channel (downstream) 344, 346, and 348 as shown in FIG. 3, respectively. According to certain embodiments, the first and second negative pressure sources can or can not be independent negative pressure sources, and can or can not be configured to operate sequentially and/or simultaneously.

According to certain embodiments of the present invention, the system can be configured to selectively draw fluid from the first and/or the second reservoir into the first and/or the second secondary fluid channel when the negative pressure source that is connected (downstream) to the secondary fluid channels is activated and one or both of the reservoir's vent is unsealed, open.

For example, as shown in FIG. 3, if the first reservoir were unsealed and the second reservoir were sealed, and if the negative pressure source, 352, were activated, fluid in the first reservoir would be selectively drawn into both fluid channels, 346, 348. The secondary fluid channels, 346 and 348, are in a parallel position.

As another example, if the first reservoir were sealed and the second reservoir were unsealed, and if the negative pressure source, (connected to two parallel secondary fluid channel output ends) were activated, fluid from the second reservoir would be selectively drawn into at least one of the secondary fluid channels.

As yet another example, the first negative pressure source 328 is connected to the output end of the first fluid channel 344 and the second negative pressure source 352 is connected to the output end of a second fluid channel, 346 and 348. If the first reservoir were unsealed and the second reservoir were sealed, and if the first negative pressure source 328 were activated, fluid from the first reservoir would be selectively drawn from the reservoir into the first secondary fluid channel 344 but not into fluid channels 346, 348. Depending on whether or not the second negative pressure source functions as a closed valve when not activated (thereby restricting fluid flow through the pressure source), fluid in the second fluid channel can be drawn into the first fluid channel. However, when it is desirable to prevent any flow, a shut-off valve 354 and/or one-way valve 356 and/or a negative pressure source 352 that functions as a closed valve, e.g., a peristaltic pump, (when not activated) can be included in the case of multiple fluid channels. The valve is positioned to allow flow into the input end of the fluid channel and to restrict fluid flow out of that input end.

Alternatively, it can be desirable to allow fluid transfer between parallel fluid channels. For example, it can be desirable to draw fluid from a reservoir into a first fluid channel, and then draw the same fluid sample into a second parallel fluid channel. This can be accomplished, for example, by effectively unsealing the reservoirs, effectively unsealing the output end of the first fluid channel, and activating a negative pressure source connected to the output end of the second parallel fluid channel. This flow arrangement could be used, for example, to allow for the sequential analysis of a single sample in multiple parallel fluid channels configured to analyze a sample.

According to certain embodiments, the system can include multiple flow channels arranged in a serial arrangement. As shown in FIG. 3, the first 316 and second 322 reservoir output ducts can be fluidically connected to an input end of a first fluid channel 340. An output end of the first fluid channel 340 can be fluidically connected to an input end of a second fluid channel 342, and an output end of the second fluid channel 342 can be fluidically connected (directly or indirectly) to the negative pressure sources 328, 352. According to certain embodiments, fluid can be selectively drawn into the first secondary fluid channel, and allowed to stop (by, for example, deactivating the negative pressure source) in the first secondary fluid channel before being subsequently drawn into the second secondary channel connected in series. This flow arrangement could be used, for example, to allow for the sequential analysis, including fixed and/or variable incubation and/or analysis periods, of a single sample in multiple parallel fluid channels configured to analyze a sample.

According to certain embodiments, the system can be configured such that fluid does not flow into the primary fluid channel unless both the negative pressure source is activated and at least one reservoir is unsealed. In the case of multiple negative pressure sources, the system can thus include auxiliary cut-off valves and one-way valves, as discussed above. These auxiliary elements can be contained in other embodiments as well.

Additionally, unwanted fluid flow can be controlled by using gravity in order to maintain it in a desired location, e.g., in a given reservoir(s). For example, the connection path between a given reservoir and a given fluid channel can include the fluid being drawn to a height above the fluid level in the reservoir, such that inadvertent or unwanted fluid flow is eliminated or minimized absent the activation of the negative pressure source and venting, opening, of the appropriate vent. Unwanted fluid flow can also be minimized and/or eliminated in certain embodiments by including a barrier between or extending the separation of the connections of the multiple reservoirs into a common path leading to the fluid channel.

The negative pressure source used to selectively draw fluid into the fluid channel can be any pressure source capable of drawing/moving a fluid. The negative pressure source can be, e.g., a pump, including a pump chosen from a peristaltic pump, a suction pump, a syringe pump, and an adsorption pump; an evacuated receptacle or cylinder; or a negative pressure source resulting from a chemical reaction, e.g., a reaction that yields a net reduced volume, such as the condensation reaction, $2H_2(g)+O_2(g)\rightarrow 2H_2O(l)$. The selection of a negative pressure source can depend, among other things, on the compatibility of the negative pressure source with the fluid, the viscosity of the fluid, the overall resistance of the fluidics system, the required flow rate, the capacity, the size and/or weight of the negative pressure source, the electrical requirements of the negative pressure source, and/or the reliability of the negative pressure source. The flow rate of the fluid can be for example, nl/min to ml/min.

Figure 5:
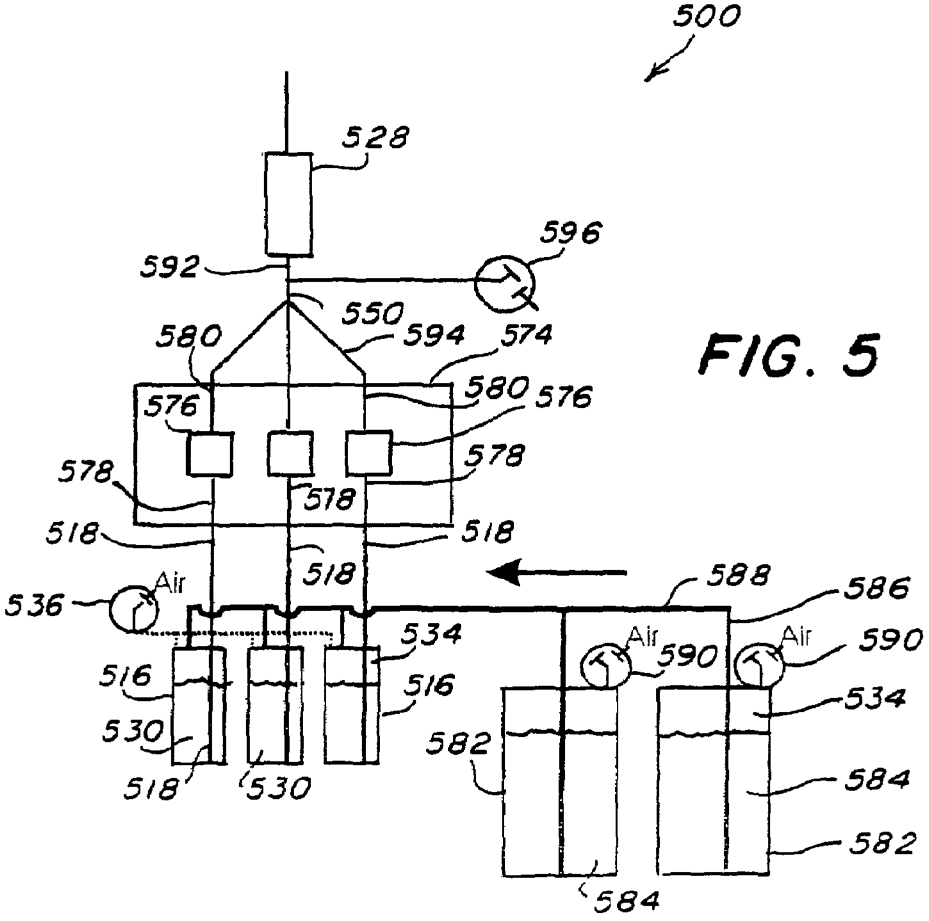
FIG. 5 is a schematic representation of a three-sample reservoir/chamber, two-reagent reservoir, and multiple fluid channel fluidics system with a system relief vent.

According to certain embodiments, the reservoirs can contain multiple sub-reservoirs. For example, a first sealable reservoir can include a first and a second fluid chamber. Each chamber can have a fluid input duct for withdrawing the fluid from the reservoir and an output end connected to the primary fluid channel input end The vent can be configured to selectively seal or unseal both fluid chambers. The system can be configured to selectively draw fluid into the primary fluid channel from at least one of (1) the first and second fluid chambers and (2) the second reservoir, when the negative pressure source connected to the secondary fluid channel is activated and the respective chambers or reservoir is unsealed. In FIG. 5, reference number 516 designates chambers.

According to certain embodiments, the primary fluid channel can include a first and a second secondary fluid channel. Each of the secondary fluid channels can contain input and an output end. The first sealed reservoir can contain first and second fluid chambers. Each of the chambers can contain a fluid input and output duct connected to the first and second secondary fluid channel input ends. The vent can be configured to selectively seal or unseal both of the fluid chambers. The system can be configured to selectively draw fluid into at least one of the secondary fluid channels from at least one of (1) the first and second fluid chambers and (2) the second reservoir, when the negative pressure source is activated and the respective chambers or reservoir is unsealed.

The negative pressure source can include first and second negative pressure sources connected, respectively, to the first and second secondary fluid channel output ends, when, for example, the secondary fluid channels are arranged parallel to each other. According to certain embodiments, the system can be configured to selectively allow fluid to be drawn into one or more of the secondary fluid channels from the first and/or second fluid chamber, and/or (2) the second reservoir when the negative pressure source connected to the secondary fluid channel is activated and the respective chamber or reservoir is unsealed, open.

According to certain embodiments, the system can be an analysis system. For example, the system can be configured to analyze at least one sample, such as a fluid sample or a sample dispersed in a fluid, for the presence or absence of a given analyte. For example, the fluid channel can be configured to be responsive or sensitive to the presence or absence of the analyte. Thus, according to certain embodiments, the sample fluid can be selectively drawn into the fluid channel, where it can interact with a surface or species sensitive to its presence or absence, or otherwise be probed, such as probed optically, magnetically, chemically, radioactively, and/or electrically. According to certain embodiments, at least one of the first and second reservoirs is configured to contain at least one sample fluid. For example, the sample fluid can be introduced into and/or stored in a reservoir prior to being selectively drawn into the primary fluid channel. The primary fluid channel can be the location of a detector for analyte detection and/or identification.

According to certain embodiments, the analysis can further involve selectively introducing at least one reagent fluid into said primary fluid channel. For example, the reagent fluid can contain a rinse solution to remove excess sample; or a reactive solution to react with residual sample or species in the primary fluid channel. According to certain embodiments, reagents can be introduced into the fluid channel any of prior to, simultaneously with, or subsequent to (and combinations thereof) the introduction of the sample into the fluid channel. According to certain embodiments, at least one of the first and second reservoirs can be configured to contain at least one reagent fluid. For example, the reagent fluid can be introduced into and/or stored in a reservoir prior to being selectively drawn into the primary fluid channel.

According to certain embodiments, the system can contain a waveguide. For example, at least one internal side of the primary fluid channel can be a waveguide, such as a single mode or multi-mode waveguide. For example, waveguides as disclosed in U.S. Pat. Nos. 6,192,168 and 6,137,117, the disclosures of which are incorporated herein by reference, can be used. According to certain embodiments, the system can further contain a waveguide for surface-sensitive optical detection of an analyte in a fluid sample. For example, at least one internal side of the primary fluid channel can be a waveguide.

According to certain embodiments, the system can further include a multi-mode waveguide for surface-sensitive optical detection of an analyte in a fluid sample. The multi-mode waveguide can have a surface having a patterned reflective coating. The patterned reflective coating defines a reflectively coated region, e.g., and having an optically exposed region on the surface. The optically exposed region can be sensitive to the analyte so as to produce an alteration of the optically exposed region which is indicative of the presence of the analyte in the sample. The alteration is detectable by launching a light wave into the waveguide to generate an evanescent field on the patterned surface, and then detecting an interaction of the first optically exposed region with the evanescent wave. According to certain embodiments, the optically exposed region of the waveguide can define at least part of at least one surface of the primary fluid channel.

According to certain embodiments, the system can further include a waveguide sensing system. The waveguide sensing system can contain, for example, a plurality of waveguides, each waveguide having a first surface, a second surface opposing the first surface, and an end surface essentially perpendicular to the first and second surfaces. The first surface of each of the waveguides can have analyte recognition elements thereon. This system can further include a waveguide holder to which each of the waveguides are secured, and an optical detector positioned opposite the end surface of at least one of the waveguides. According to certain embodiments, at least one of the first surfaces can define at least part of at least one surface of the primary fluid channel.

According to certain embodiments, at least one of the reservoirs of the system can contain an internal cavity configured in such a manner as to be sealed from contact with an external atmosphere. For example, according to certain embodiments, the at least one internal cavity can be connected to a vent that is configured to selectively connect and disconnect the respective internal cavity from contact with the external atmosphere. According to certain embodiments, the vent can be configured to switch, in a binary fashion, between an "opened" and a "closed" position. Valves can be configured to be fully opened, partially opened, and fully closed and variation (including temporal) and combination thereof.

According to certain embodiments, valves can be chosen from one-way valves, two-way values, multi-way valves, and proportional valves, and combinations thereof. For example, if the valve is a one-way valve, it can be switched between an opened and closed position. Two-way and multi-way valves can be used, for example, to connect a reservoir or cavity to multiple external pressures, including atmospheric, positive, and negative, and/or to additional fluid supplies. Valves can also be configured to open and close multiple reservoirs or cavities. For example, an input of a two-way valve can be connected to a given pressure source, one of the two valve outputs can be connected to one reservoir or cavity, and the second valve output can be connected to another reservoir. Then, for example, the valve can be used to selectively connect either of the two (or more) reservoirs to the pressure source.

According to certain embodiments, a valve V comprising one input I and two (or more) outputs O1 and O2 can be used to selectively seal and/or unseal two (or more) reservoirs, R1 and R2. For example, input I can be connected to the atmosphere (or a positive pressure source) with outputs O1 and O2 connected to reservoirs R1 and R2, respectively. When valve V is configured to connect I to O1 but not O2, R1 will be unsealed and R2 will be sealed. Likewise, when valve V is configured to connect I to O2 but not O1, R2 will be unsealed and R1 will be sealed.

According to certain embodiments, the system can be configured to simultaneously have fluid drawn from the first and/or second reservoir into the primary fluid channel at a first and/or a second flow rate, respectively, when the difference between the first and second flow rates is proportional to a difference in the unsealing of the first and second vents. According to certain embodiments, the system can be configured to selectively have fluid drawn from the first and second reservoirs into the primary fluid channel at first and second flow rates, respectively, when the difference between the first and second flow rates is proportional to the differential fluid flow resistance. The differential fluid flow resistance is adjusted by the sealing and unsealing of the first and second vents.

According to certain embodiments, at least one of the vents or valves can be a proportional valve configured to partially or fully unseal a reservoir. For example, to favor fluid flow from a first reservoir, a proportional valve can be connected to the first reservoir which can then be opened to a relatively greater degree to a given pressure source. At the same time a second reservoir connected to a second reservoir can be opened to the same pressure source to a relatively lesser degree. According to certain embodiments, the differential fluid flow can be at least partially controlled by the relative pressure of the pressure sources to which the reservoirs are connected. For example, to favor fluid flow from a first reservoir, it can be vented (opened) to a relatively high pressure source while a second reservoir can be connected to a relatively low pressure source. According to certain embodiments, differential fluid flow can be controlled by any combination of proportional valves, relative vent source pressures, fluid viscosities, fluid channel diameters, fluid channel surfaces (e.g, rough, smooth, hydrophobic, hydrophillic, chemically derivatized, biologically derivatized, etc.), and pressure and current of the one or multiple negative pressure sources.

According to certain embodiments, the system can further include a system relief vent connected to the primary flow channel. For example, the system relief vent can be configured to seal or unseal, open or close, the primary flow channel from contact with an external atmosphere. According to certain embodiments, when the system relief vent is in a closed or an open position, fluid flow from the reservoirs/chambers into the primary fluid channel is respectively enabled or disabled. According to certain embodiments, the system relief vent can be configured to allow a fluid, such as air and/or any of its component gases, to fill the primary fluid channel, and/or displace a volume of the fluid previously contained therein. The previous fluid can be, for example, a sample or reagent fluid, as discussed further herein.

According to certain embodiments, a reservoir can be selectively connected to atmospheric pressure or a positive pressure source that is configured to apply pressure greater than atmospheric pressure or a negative pressure source, that is configured to have a pressure less than atmospheric pressure to the unsealed reservoir.

According to certain embodiments, the system can further contain an auxiliary fluid reservoir and a connection valve. The auxiliary fluid reservoir 335 can be connected through the connection valve 337 to an auxiliary input duct 339 of at least one of the first and second reservoirs. According to certain embodiments, the system can be configured to selectively have a fluid drawn from the auxiliary fluid reservoir into the first and/or second reservoir when the negative pressure source is activated, the connection valve is open, and the respective reservoir is closed or not vented to the atmosphere.

The connection valve can be a multi-way connection valve, configured to selectively connect the auxiliary input to a source chosen from the atmosphere, a positive pressure source, a negative pressure source, and a fluid reservoir.

According to certain embodiments, a single valve can be used to seal or unseal a reservoir, as well as the connection valve to connect the reservoir to the auxiliary fluid reservoir.

According to certain embodiments, the sizes and dimensions of the fluid channels, including the primary and secondary fluid channels, can be configured to control a range of dynamic and static parameters, including, for example, the fluid flow rate, capacity, resistance, and turbulence. According to certain embodiments, the primary fluid channel and/or the connecting channels and/or other fluid channels in the system can be configured to have minimal cross-sectional dimensions such that the selective fluid drawing can be turbulent fluid flow.

According to certain embodiments, the primary fluid channel and/or the connecting channels and/or other fluid channels in the system may be configured to have minimal cross-sectional dimensions such that the selective fluid drawing may or may not be a low Reynolds number fluid flow.

According to certain embodiments, the primary fluid channel and/or the connecting channels and/or other fluid channels in the system may be configured have minimal cross-sectional dimensions such that the selective fluid drawing may or may not be a low Reynolds number fluid flow when the fluid has a density less than five times the density of water.

According to certain embodiments, the primary fluid channel and the connecting channels are configured to have minimal cross-sectional dimensions such that the selective fluid drawing may or may not be a low Reynolds number fluid flow when the fluid is an aqueous fluid.

According to certain embodiments, the system can further include a first connecting channel and a second connecting channel, wherein first and second reservoirs are connected to the primary fluid channel input by first and second connecting channels, respectively. The connecting channels, the primary fluid channels, the secondary channels and reservoir/chamber output ducts can have minimum cross-sectional dimensions greater than 1 micron. For example, the range of the cross-sectional size of any of the ducts and/or channels in which a fluid moves can be at least 10% greater than the largest particle size found in any of the fluids, e.g., whether a sample, a reagent or a indicator.

According to certain embodiments, the system can include a three-dimensional fluid circuit (or fluid cube) comprising at least one of the first and second reservoirs and the primary fluid channel. According to certain embodiments, the fluid circuit can include a series of layers, where the individual layers comprise at least partial elements of the fluid circuit, such that, when some or all of the series of layers are fused (or joined) together, complete elements of the fluid circuit are formed.

According to certain embodiments, at least partial elements are formed by at least one of molding and mechanical, chemical, thermal, and optical etching. For example, the fluid circuit can include elements formed using injection molding techniques, as well as elements formed using other molding techniques, including blow molding.

According to certain embodiments, the fluid circuit can further include a first connecting channel and a second connecting channel, wherein the first and second reservoir output duct ends are connected to the primary fluid channel input ends by first and second connecting channels, respectively. The fluid circuit can also be configured, for example, so that the first and second connecting channels have first and second input ends. These input ends of the connecting channels can be connected to the first and second fluid output ducts, respectively. The common channel can have a first and a second end, where the first end can be connected to the second ends of the connecting channels, and the second end be connected to the input of the primary fluid channel input ends.

According to certain embodiments, the first and second connecting channels can further be J-shaped connecting channels, where the lower ends of the J-shaped connecting channels can be connected to each of the reservoirs and the upper ends of the connecting channels can be connected to the common primary channel and/or secondary channels. The connecting channels can further include a barrier. The barrier is configured to inhibit fluid flow between the first and second connecting channels.

According to certain embodiments, the fluid circuit can further include at least one of a first pressure duct and a second pressure duct, where the first and second pressure ducts connect the first and second vents to the first and second reservoirs, respectively.

According to certain embodiments, the system can be a portable analysis system, that includes a three dimensional fluid circuit. The fluid circuit can include a first sealed reservoir. The first sealed reservoir can include a first fluid output duct that is fluidically connected to the primary fluid channel input, and a first vent configured to selectively seal and/or unseal (open or close) the first reservoir. The fluid circuit can further include a second sealed reservoir having a second fluid output duct fluidically connected to the primary fluid channel input, and a second vent configured to selectively seal and/or unseal (open or close) the second reservoir. A negative pressure source can be connected to the primary fluid channel output end. The system can be configured, for example, to selectively draw at least one fluid from at least one of the first and second reservoirs into the primary fluid channel when the negative pressure source is activated and the respective reservoir vent is unsealed.

According to certain embodiments, the system can be configured to perform biological and/or chemical analysis. The system can also comprise a three dimensional fluid circuit that has a first reservoir having a first fluid output duct fluidically connected to a primary fluid channel input, and a first vent configured to selectively seal and/or unseal the first reservoir. The system can further include a second sealed reservoir having a second fluid output duct fluidically connected to the primary fluid channel input, and a second vent configured to selectively seal and/or unseal the first reservoir. A negative pressure source can be connected to the primary fluid channel output. The system can be configured, for example, to selectively draw at least one fluid from at least one of the first and second reservoirs into the primary fluid channel when the negative pressure source is activated and the respective reservoir is unsealed. The fluid circuit elements can be formed using molding or milling techniques. The circuit can contain a series of layers, in which some or all of the layers of the series have at least partial elements of the fluid circuit. Some or all of the series of layers can be fused (or otherwise joined, permanently or temporarily) together to form completed elements of the fluid circuit. The at least partial elements are formed by, for example, at least one of molding and mechanical, chemical, thermal, and optical etching. The fluid circuit can further include a first connecting channel and a second connecting channel, where the first and second fluid outputs are connected to the primary fluid channel input by first and second connecting channels, respectively.

The system can further contain a common channel. It can be configured such that the first ends of the connecting channels are connected to the first and second fluid outputs, respectively, and a first end of the common channel is connected to the second ends of the output connecting channels, and a second end of the common channel is connected to the input of the primary fluid channel input. The first and second output connecting channels can also have J-shaped connecting channels configured such that the lower end of the J-shaped connecting channel is connected to the reservoir, e.g., at the bottom of the reservoir. The upper end of each connecting channels is connected to the common channel. The connecting channels can further include a barrier configured to inhibit fluid flow between the first and second output connecting channels. Additionally, the fluid circuit can further include at least one of a first pressure duct and a second pressure duct, where the first and second pressure ducts connect the first and second vents to the first and second reservoirs, respectively.

According to certain embodiments, the present invention comprises a method of controlling fluid flow. The method can comprise, for example, selectively drawing at least one fluid from at least one of a first and a second reservoir into a primary fluid channel. The selective drawing involves activating a negative pressure source and unsealing one of the reservoirs. According to certain embodiments, the first reservoir can contain a first fluid output duct fluidically connected to the primary fluid channel input, and a first vent configured to selectively seal and/or unseal the first reservoir. According to certain embodiments, the second reservoir can contain a second fluid output duct fluidically connected to the primary fluid channel input, and a second vent configured to selectively seal and/or unseal the second reservoir. According to certain embodiments, the negative pressure source can be connected to the primary fluid channel output.

According to certain embodiments, the selective drawing of a fluid can involve (wholly, partially, and/or for a controlled duration and/or cycle) sealing at least one of the unselected reservoirs and/or (wholly, partially, and/or for a controlled duration and/or cycle) unsealing at least one of the selected reservoirs, and drawing at least one fluid from at least one selected reservoir.

According to certain embodiments, the selective drawing can involve partially unsealing at least one first selected reservoir and partially unsealing at least one second selected reservoir, and drawing fluid from both the first and second reservoirs. For example, partial opening means partially unsealing (or opening) a vent to partially open a reservoir to at least one of the atmosphere and applied pressure.

According to certain embodiments, unsealing a selected reservoir can involve connecting it to a first pressure source, and sealing a selected reservoir can involve connecting it to a second pressure source, where the pressure of the first pressure source is greater than the pressure of the second pressure source. According to certain embodiments, unsealing a selected reservoir can involve opening a vent such that the selected reservoir is connected to atmospheric pressure, e.g., by releasing the vacuum. According to certain embodiments, unsealing a selected reservoir can involve application of a pressure less than an atmospheric pressure to the selected reservoir. According to certain embodiments, sealing a selected reservoir can involve applying a pressure greater than an atmospheric pressure to the selected reservoir.

According to certain embodiments, the present invention comprises a method of performing an assay. The method can allow for the, for example, selective drawing of a sample fluid from a sample reservoir into a primary fluid channel.

According to certain embodiments, the selected sample (reagent) fluid that is drawn can involve activating the negative pressure source, unsealing the sample (reagent) reservoir, and sealing the reagent (sample) reservoir.

According to certain embodiments, at least one side of the primary fluid channel is configured to at least one of capture, recognize, respond to, and detect at least one analyte. At least one side can contain a waveguide that can, for example, have a first optically exposed region sensitive to a first analyte so as to produce an alteration of the first optically exposed region that is indicative of the presence of the first analyte in the sample. The alteration is detectable by launching a light wave into the waveguide to generate an evanescent field at the patterned surface, and then detecting an interaction of the first optically exposed region with the evanescent wave.

According to certain embodiments, the waveguide can contain a multimode waveguide having a surface bearing a patterned reflective coating. The patterned reflective coating defining a reflectively coated region and an optically exposed region on the surface. The optically exposed region is configured to produce an alteration that is indicative of the presence of an analyte. The alteration is detectable by launching a light wave into the waveguide to generate an evanescent field at the patterned surface, and then detecting an interaction of the optically exposed region with the evanescent wave.

According to certain embodiments, the at least one fluid has a density not less than an atmospheric density. The fluid may, for example, comprise a liquid, a gas having a density not less than an atmospheric density, and/or a mixture wherein the density of the mixture is not less than an atmospheric density.

According to certain embodiments, the at least one fluid can be a dispersion, a solution, a suspension, or an emulsion. According to certain embodiments, the at least one fluid can be an aqueous fluid.

According to certain embodiments, at least one fluid can be a biological or chemical specie. For example, at least one fluid can contain an antibody, antigen, toxin, drug, metabolite, polypeptide virus, protein, cell, amino acid, or amino acid sequence. For example, the fluid can be a buffer, stabilizer, preservative, enzyme, sugar or lack of a metabolite.

According to certain embodiments, the at least one fluid can be tagged labels, including tagged labels selected from optically, radioactively, magnetically, chemically, biologically, and physically (such as mass and/or size and/or shape) tagged labels.

According to certain embodiments, the invention pertains to a method and apparatus for delivery a fluid to a selected reservoir. For example, if the negative pressure source in FIG. 1 is a pump configured to push a fluid towards the reservoirs, and one reservoir 116 is unsealed and the other reservoir 122 is sealed, the fluid will be selectively delivered to the unsealed reservoir 116.

The invention will be further clarified by the following examples, which are intended to be purely exemplary of the invention.

Examples I and II are generalized versions of actual constructed embodiments, but may not have been actually constructed themselves as shown in the referenced figures.

EXAMPLE I

Figure 4:
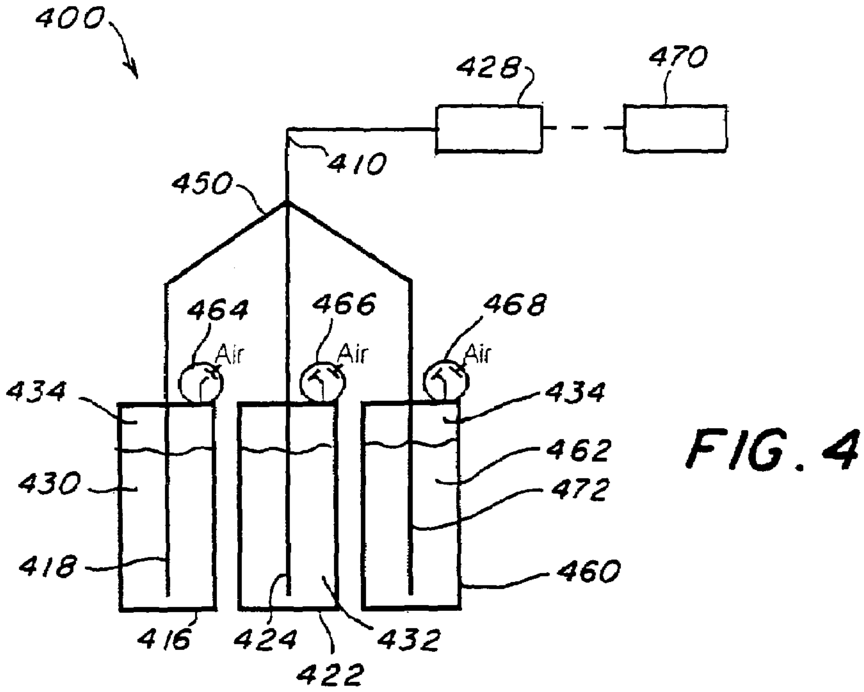
FIG. 4 is a schematic representation of a three-reservoir fluidics system with venting valves controlled by a controller.

A schematic illustration of an exemplary fluid flow control arrangement 400 is depicted in FIG. 4. Arrangement 400 includes three reservoirs 416, 422, and 460 in which respective fluids 430, 432, 462 and gas space 434 are contained. The reservoirs are all fluid-tight (enclosed). Fluidly connected to each reservoir is a respective pressure relief valve 464, 466, 468. Pressure relief valves can be manually or remotely actuated to move between an open position where pressure relief or air is provided to the respective reservoir and a closed position where no pressure relief or air is provided to the respective reservoir. In this arrangement, pressure relief valves are each automatically actuated remotely by a suitable control 470 as schematically shown, and are in a closed (default) position when not actuated. Extending into or near a bottom of each respective reservoir is a respective outlet pathway or duct 418, 424, 472. The outlet ducts are connected by a manifold, 450, to a primary fluid channel, 410, which is in turn connected to a negative pressure, 428, as a pump. Any number of reservoirs can be similarly connected to the manifold as long as the manifold has sufficient branches.

When it is desired to draw a selected fluid from the associated reservoir, such as fluid 430 from associated reservoir 416 the associated pressure relief valve 464 is actuated to move from the closed position to the open position (as shown in FIG. 4). With this opening of the pressure relief valve, atmospheric air is now allowed to back fill the reservoir. At the same time, or previously or subsequently, negative pressure source 428 is actuated to exert a negative pressure, e.g. suction, on all fluids in all reservoirs. However, as only reservoir 416 has an open pressure relief valve 464, only fluid 430 is drawn from reservoir 416 into outlet duct 418 and through manifold 450 to the desired delivery point. In this manner, fluid 430 is preferentially drawn from reservoir 416 as air is permitted to flow into and back fill reservoir 416 through open valve 464 while reservoirs 422 and 460 remained sealed from the atmosphere and hence comparatively resistant to flow into the outlet ducts 424 and 472. If more than one pressure relief valve is opened, then fluids from multiple reservoirs can be drawn though manifold 450 simultaneously, and combined at the common outlet of manifold and then conducted towards the negative pressure source 428

It can thus be appreciated that the fluid flow control arrangement 400 allows for selective fluid flow from a selected reservoir to a use point, e.g., the primary channel or a detector in the primary channel. The necessity of passing the selected fluid through any valves or the necessity of resorting to micro-scale fluidics channels is eliminated. Thus, while the system can or can not contain valves through which the fluids must pass, such valves are not required for all embodiments and problems with valves and channels clogging due to contaminants in the fluid are avoided. It will further be appreciated that this arrangement is a reduction in both the overall size and power consumption compared to other fluidics arrangements as the pressure relief valves can be made relatively small since normally only a gas passes through and such a small valve requires very little power.

EXAMPLE II

Depicted schematically in FIG. 5 is a first embodiment of a portable bio/chemical analysis system 500 incorporating a fluid flow control arrangement as broadly discussed above whereby a plurality of sample fluids can be first simultaneously analyzed and then can be further simultaneously analyzed after addition of one or more reagents. The system includes a bio/chemical analysis device 574 having analyzing channels 576 in which analysis of a fluid can be performed as is well known in the art. One surface of the analyzing channels 576 can be a waveguide for performing optical analysis. For example, a waveguide in the plane of the figure co-extensive in area with the analysis device 574 could be used. Each analyzing channel 576 includes an associated inlet 578 and an associated outlet 580 as shown. Associated with each analyzing channel 576 is a sample reservoir/chamber 516 in which a sample fluid 530 and air 534 are respectively provided. First pathways or ducts 518 respectively connect a bottom of sample reservoirs 516 to respective inlets 578 of analysis device 574. All sample reservoirs 516 are connected to a common sample pressure relief valve 536 as schematically shown. When sample pressure relief valve 536 is opened, pressure relief (back fill air) is provided above each sample in each reservoir.

Bio/chemical analysis system 500 also includes reagent reservoirs 582 in which reagent fluids 584 and air space 534 are respectively provided. Each reagent fluid is conducted through a second pathway to the associated analyzing channel 576. This second pathway includes second ducts 586 respectively connected to a lower portion, i.e., below an upper level of each fluid 584 of each reagent reservoir 582, and a common duct 588 connected to the tops of sample reservoirs 516. In this embodiment where reagent fluid 584 is delivered to a selected reservoir, the second pathway includes ducts 518 as well to complete the path to the analyzing channels 576. Each reagent reservoir has connected thereto a respective reagent pressure relief valve 590 as shown.

As shown in FIG. 5, the system further includes a pump 528 which serves as a source of negative pressure to draw fluids into and through analyzing channels 576 of analysis device. Pump 528 is connected to an outlet duct 592 of a suitable manifold 550, whose inlet ducts 594 are respectively connected to outlets 580 of analysis device. If desired, a system pressure relief valve 596 is also connected to outlet duct 592 of manifold 550. System pressure relief valve 596 is opened to feed gas to pump 528 and hence to disable any flow of sample or reagent fluids in analysis system. One or more system pressure relief vents can also be connected to inlets 578, and can not only disable fluid 530 or 584 flow through the channels 576, but also can be used to introduce air or gas into the channels, e.g., 576 to displace the fluids 530 or 584 and/or to dry interior surfaces of channels 576.

With this system, it is possible to analyze sample fluids 530 simultaneously with analysis device 574, both before and then after the addition of one or two reagent fluids 584 to the sample fluid. Thus, in operation, pump 528 is initially actuated after analysis device 574 is made ready to analyze any associated fluid passing through respective analyzing channels 576. Sample pressure relief valve 536 is then simultaneously (or subsequently or previously) opened, allowing back fill air into all sample reservoirs 516. This allows the pump 528 to draw the associated sample fluid 530 from each respective reservoir 516 through the associated analyzing channel 576, where analysis device 574 conducts all or part of the needed analysis for a reading or analysis of each respective sample fluid. During this initial analysis step, reagent pressure relief valves 590 are all closed, so no reagent fluid is drawn into sample reservoirs.

After the first analysis step of the sample fluids is accomplished, sample pressure relief valve 536 is closed and a selected one (or both) of reagent pressure relief valves 590 is opened. This causes the negative pressure created by pump 528 in each sample reservoir 516 to cause a flow of reagent fluid from whichever reagent reservoir 582 can be back filled with air due to an open reagent pressure relief valve 590. Thus, after a small time period of operation of pump 528 after opening of one or more reagent pressure relief valves 590, a reagent fluid 584 is delivered to the associated analyzing channels 576 for analysis by analysis device 574. If the sample fluid had been substantially depleted from the reservoirs, then relatively pure reagent may be delivered to the channels. However, if the sample fluid has not been substantially completely removed, according to the embodiment shown in FIG. 5, the reagent could be mixed with the sample fluid in reservoir. According to one mode of operation, one of the regent fluids would be a wash fluid, such as a buffer fluid, to wholly or partially rinse remaining sample fluid out of reservoirs and channels. Then, for example, a second reagent fluid can be delivered through reservoirs into channels without mixing with sample fluids.

Where required, the amount of reagent fluid delivered to each sample reservoir can be varied as desired where the rate of flow of reagent fluid through ducts is known and the associated open pressure relief valve is closed after the desired flow volume is achieved (after which sample pressure relief valve is opened again). Alternately, the amount of reagent fluid in each reagent reservoir can be known, and flow maintained until the associated reagent reservoir is emptied. Similarly, the amount of sample fluid in each sample reservoir can be controlled by knowing the initial volume as well as the flow rate through first ducts and inlets; and this control can include emptying of the sample fluid therefrom so that only a reagent fluid is then drawn to the analysis device.

When considering the range of fluid types, channel/duct sizes, pump pressures, and substrate materials, the following may also be considered. The relief valve control arrangement for the fluidics system operates when the resistance to flow of a first fluid in a first reservoir (due to surface tension, channel size, channel material, etc.) is less than the resistance to flow of a second fluid in the second reservoir that has been sealed-off from the atmosphere. This difference in resistance between the flow of the first and second fluids should be greater than the potential of the negative pressure source at the flow rate used. Without being bound by theory, a relation analogous to Ohm's law can be used to express this requirement. That is, relief valve control will operate under conditions such that:

$$R>P/I,$$

where:

R=R2−R1, where R2 is the resistance to fluid flow caused by sealing the fluid from atmosphere and R1 is the resistance to fluid flow due to factors such as fluid channel size, viscosity, channel material, etc.; and P is the pressure difference between the negative pressure source and ambient or sealing pressure; and I is the flow rate of the negative pressure source.

EXAMPLE III

As shown schematically in FIG. 1, two reservoirs 116, 122 were connected through a manifold 150 to a primary fluid channel 110 comprising fluorescence detector, 133. The fluorescence detector was used to detect a fluorescent dye in one of the fluids 130, possibly water. The reservoir 116 contained water. Reservoir 122 contained a 60 nM aqueous solution of fluorescent dye Cy5, 132. Each reservoir was sealed, closed, to the atmosphere except that each was connected to vents 120, 126 to micro relief valves 136 ("vent 1") and ("vent 2") (LFAA12034, The Lee Company), respectively. The default closed position of the valve caused the given reservoir to be sealed from the atmosphere. The relief valves 136 could be individually actuated (via a 12 volt signal) to open a given reservoir to atmospheric pressure. The negative pressure source 128 was a peristaltic pump, running at 1.5 ml/min. It was used to draw fluid from each of the reservoirs and through the fluid channel 110 comprising detector 133 to a waste collector (not shown). In this configuration and as described above, when vent 120 was open the fluid in 116 (water) would be drawn through the detector by the pump. The fluid, Cy5, 132 did not flow because of its greater resistance to flow resulting from the inability of air to replace back fill the fluid being withdrawn from the reservoir. The fluid in 124 would flow, exclusively, when vent 120 was closed and vent 126 was opened, and negative pressure source 128 was activated.

Figure 6:
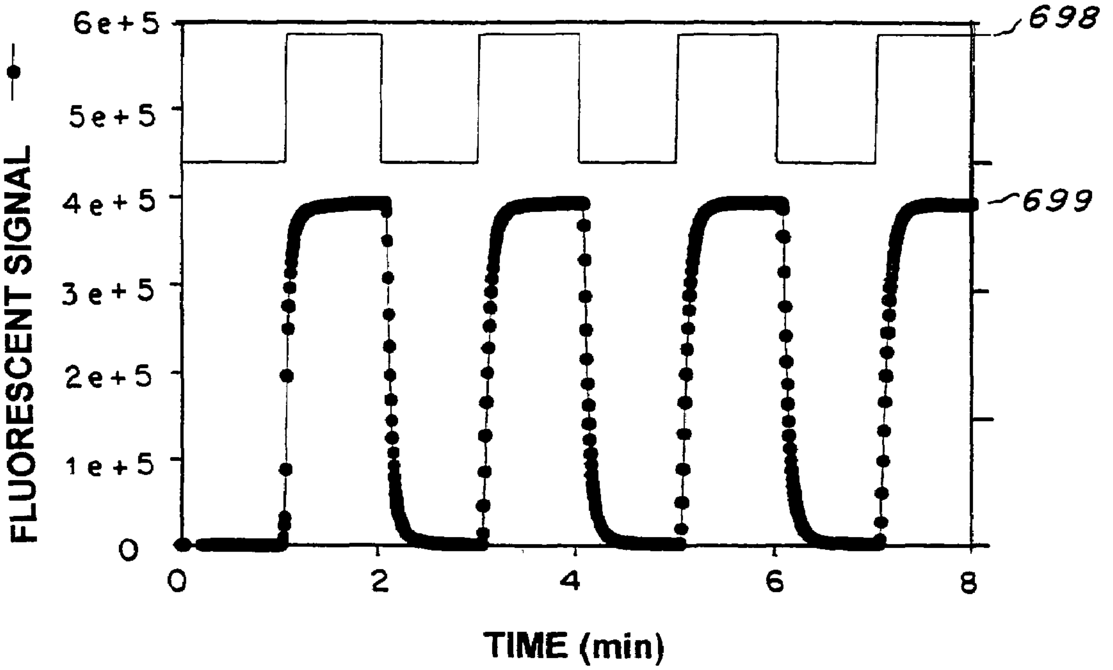
FIG. 6 shows fluorescent signals corresponding to the switching of a two-reservoir fluidics system.

As shown in FIG. 6, when vent 120 was opened and vent 126 was closed and the negative pressure source 128 was activated (see control signal, solid line, right y-axis), the fluorescence detector recorded a signal level of zero 698 (see fluorescence signal, line with points, left y-axis). This indicated that the water was pulled through the system. However, when vent 120 was closed and vent 126 was opened (and negative pressure source was 128 was activated), the fluorescence signal 699 rose sharply (in arbitrary units) since the Cy5 solution in 122 was drawn through the system and detected. The slight delay of the signal rise as compared to the opening of vent 126 was due to the finite distance that the fluid needed to flow from the T-junction (manifold 150) to the detector. The tailing of the signal level to zero when 120 was open was attributed to the detection of residual Cy5 in the fluid channels being washed out by the water.

EXAMPLE IV

Figure 7:
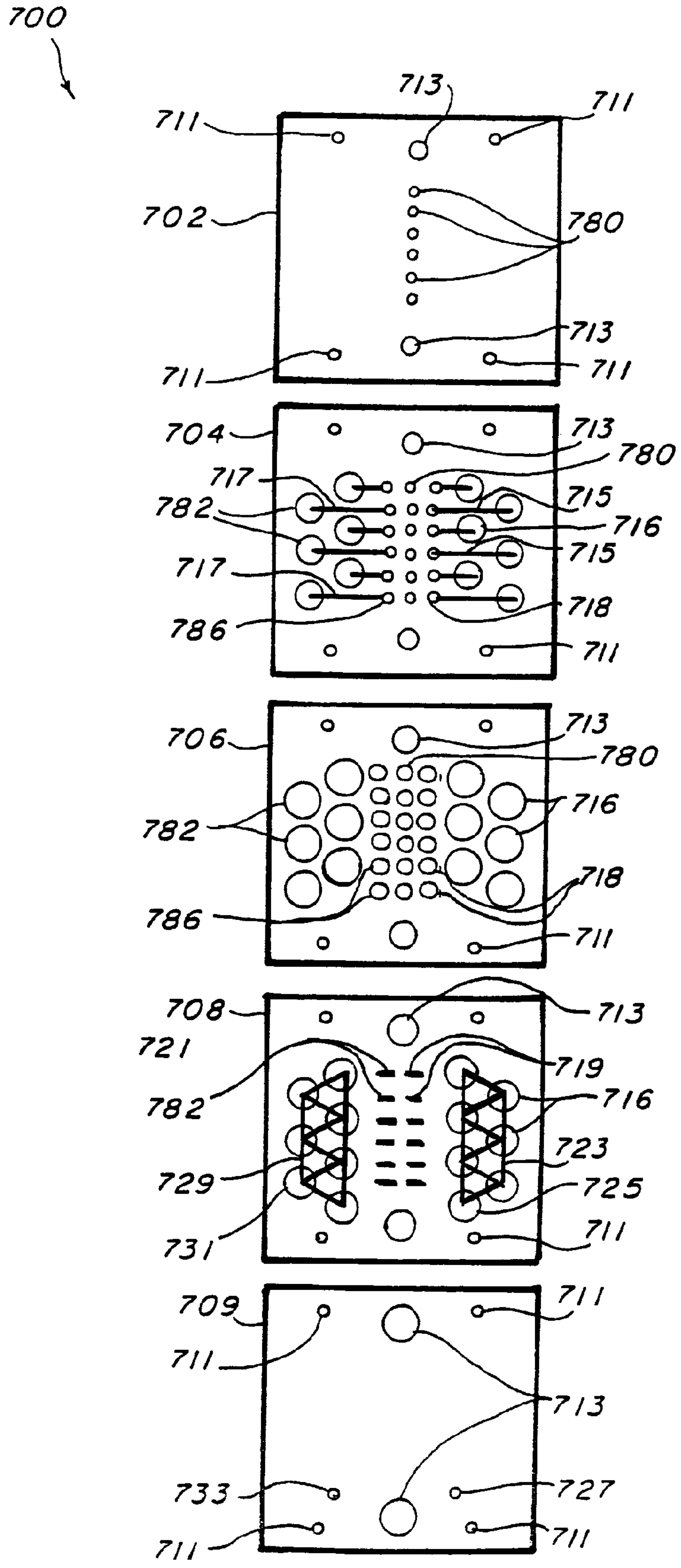
FIG. 7 is a schematic representation of a series of layers of a fluidics cube.

Depicted in FIG. 7 is a simplified (for convenience of illustration) fluid fluidics circuit which has been embodied in a modular block or cube 700 formed of a series of layers 702, 704, 706, 708, 709 (from bottom to top). Cube 700 was designed to fit into a preformed receptacle of a bio/chemical analysis device and to have an overall small size of, for example, 75 $cm^3$ where six sample reservoirs 716 and six reagent reservoirs 782 were provided for processing. Cube 700 can be designed for use in a number of different assay formats (parallel, individually selective, etc.), depending on the requirements. In this embodiment, each sample reservoir 716 and corresponding (paired) reagent reservoir 782 was each selectively connected to a respective analyzing channel in the analysis device, with all sample fluids or all reagent fluids being conducted at the same time. Six different fluid samples were analyzed simultaneously. Each sample can be analyzed for six different analytes when combined with an array sensor, e.g., as disclosed by M. J. Feldstein et al., Array Biosensor: Optical and Fluidics Systems, *Biomedical Microdevices* 1(2) (1999), and Dodson et al., Fluidics Cube for Biosensor Miniaturization, *Analytical Chemistry,* 2001, (the disclosures of which are incorporated in their entireties by reference). Alternately, cube 700 could be suitable for use with other assay methodologies as desired.

Cube 700 is essentially a passive fluid circuit in that it operates without the use of any internal valves or meters. Internal valves and/or meters could, of course, be added. Instead, the fluid circuit operates by use of external pressure relief valves and a pump in the analysis device. As shown, cube 700 was constructed of stacked layers of, for example, a thermoplastic such as poly(methylmethacrylate) for layers 704, 709 but optionally having a lower surface of layer 702 made of a compressible material such as neoprene, for pressure based sealing of the cube 700 to, for example, an assay flow cell as described in M. J. Feldstein et al., Array Biosensor: Optical and Fluidics Systems, *Biomedical Microdevices,* 1, (2), 1999. Likewise, a lower surface of layer 709 and/or an upper surface of layer 708 can optionally be made from a compressible material, for pressure based sealing of layer 709 to an upper surface of layer 708. When aligned, using, for example alignment holes 711 and joined together into cube 700, the essentially two-dimensional features of each layer provide the fluid circuit required for the present invention. Layers 704, 708 were stacked and then fused into cube under moderate pressure and heating to just above the glass transition temperature so that cube was made fluid-tight. Other methods of joining the layers together, such as adhesives or applied pressure and compressible seals, could also be used in place of or in combination with the thermal fusing process. The top layer, layer 709, can be attached to the cube using bolts in bolt holes 713 (with corresponding receptacles for the bolts in at least one of layers 702-708) or a bolt receptacles positioned below layer 702, that seals the cube using a gasket arranged between the layer 702 and the rest of cube. Sample fluids and reagent fluids can be placed into the cube before top layer 702 is attached thereto, or if desired, a dried reagent or sample can be placed into reagent reservoirs 786 before sealing for use when fluid is later added after sealing.

As shown in FIG. 7, cube 700 includes holes in each layer forming sample reservoirs 716, reagent reservoirs 782, outlet channels 780 (connected to the analyzing channels and the source of negative pressure), first ducts 786, and second ducts 786. In layer 704, suitable fluid connections 715 are made at the bottoms of sample reservoirs 716 to the bottoms of first ducts 718, and similarly suitable fluid connections 717 are made at the bottoms of reagent reservoirs 782 to the bottoms of second ducts 786. In layer 708 the tops of outlet channels 780 there beneath are connected by fluid connections 719 to the tops of first ducts 718 and similarly by fluid connections 721 to the tops of second ducts 786. Finally, as shown in layer 708, a network 723 of fluid connections can connect the tops of sample reservoirs 716 with an expanded vent cavity 725 whose top is then connected to the sample pressure relief valve (provided in the analysis device) though small vent hole 727; while a network 729 of fluid connections connects the tops of reagent reservoirs 782 with an expended vent cavity 731 whose top is then connected to the reagent pressure relief valve (also provided in the analysis device) though small vent hole 733. Conveniently, all of the holes, channels, and ducts are formed in cube by the simple drilling or machining.

With the fluid circuit embodied in cube 700, six selected sample fluids are conveniently inserted into respective sample reservoirs 716 while six selected reagent fluids are similarly inserted into reagent reservoirs 782. Thereafter, the cube is inserted as a modular unit into an analysis device adapted to receive the cube. The analysis device is then actuated in a first operation to draw the sample fluids from each sample reservoir 716 from the bottom thereof, through first ducts 718, and into outlet channels 780 for analysis in corresponding analyzing channels of the analysis device. During this first operation, it will be appreciated that the pump (or alternatively pumps) is actuated. At the same time that the sample pressure relief valve is opened so that air flows through each vent hole 727 to each sample reservoir 716. During this first operation, the reagent pressure relief valve is closed, so that no reagent fluid is drawn from reagent reservoirs 782. After suitable analysis of the sample fluids (or portions thereof), the sample pressure relief valve is closed and the reagent pressure relief valve is opened, switching the flow through outlet channels 780 from the associated sample fluids to the associated reagent fluids.

It is anticipated that a standard cube would have reservoirs 716, 782 each sufficient to hold about 0.4 ml of fluid. However, with a modular design, the reservoir volume could be increased or decreased as desired, prior to annealing or assembling of cube, by simply adding or subtracting layers 706. Layers 706 could thus be designed to add or subtract to the volume of reservoirs 716 and 782 in 0.2 ml increments as desired. In addition, if the presence of residual sample fluid in outlet channels 780 causes analysis problems after switching is made, separate sample and reagent outlet channels could be easily provided instead of the common outlet channels 780.

The cube is designed to operate with currently available miniature peristaltic pumps. Even if six such pumps were used, all six pumps would be expected to add only about 120 $cm^3$ to any analysis device and would draw minimal current (50-75 mA max per pump). This makes such pumps and cube ideal for extended battery operation contemplated for portable bio/chemical analysis systems.

While the fluidics system as described above has been depicted as having two, three or six sets of reservoirs, it can be appreciated by those of ordinary skill in the art that there is really no limit to the number of reservoirs that can be used either in a series or in a parallel arrangement, or combinations thereof. In addition, while the fluidics systems have been disclosed as being used to draw fluids out of different reservoirs, the present invention is also applicable to controlling fluids being selectively pumped into a reservoir. Further, while reservoirs of glass or plastic are typical, the present invention is applicable to reservoirs of almost any material, such as metal or ceramic, so long as the reservoir can be effectively sealed from the atmosphere. Still further, any suitable pressure relief valve, whether manual or automatic, can be used, including physical and chemical vent valves where the swelling and contracting of a polymer could function as a vent.

FIG. 8 shows a simplified three-dimensional perspective view of two sample reservoirs, two-reagent reservoirs fluidics system that is similar to the six sample, six reagent system of FIG. 7.

EXAMPLE V

A fluidics cube, substantially as described in Example IV, was used with a patterned multimode waveguide to perform bio-chemical analysis on several samples. Staphylococcal enterotoxin B (SEB) and anti-SEB antibodies were obtained from Toxin Technologies (Sarasota, Fla.). To generate capture antibodies, a long-chain derivative of biotin, N-hydroxysuccinimidyl ester (EZ-Link NHS-LC-Biotin; Pierce, Rockford, Ill.) was attached to the anti-SEB at a 10:1 biotin:protein ratio as recommended by the manufacturer. Labeled protein was separated from unincorporated biotin using a Bio-Gel P10 column, (Bio-Rad, Hercules, Calif.). Fluorescent tracer antibodies were prepared by labeling anti-SEB antibodies with Cy5 bisfunctional reactive dye ($\lambda_{ex}$=649 nm, $\lambda_{em}$=670 nm, Amersham Life Science Products, Arlington Heights, Ill.) according to the manufacturer=s instructions. Dye to protein ratios ranged from 2.5 to 4.0.

Silver-clad slides (Opticoat Associates, Protected Silver) (Feldstein, M. J., *Biomed. Microdevices,* 1999, 1:2, pp. 139-153 (the disclosure of which is incorporated herein in its entirety by reference)) were cleaned in a potassium hydroxide (KOH) solution (10 grams KOH in 100 ml isopropanol) for 30 minutes at room temperature in a Coplin jar. The slides were rinsed thoroughly with de-ionized water and dried using a stream of nitrogen.

NeutrAvidinJ (Pierce, Rockford, Ill.) was immobilized on the silvered side of the slides essentially according to the method of Bhatia et al., (Bhatia, S. K. et al., *Anal. Biochem.,* 1989, 178, pp. 408-413 (the disclosure of which is incorporated herein in its entirely by reference)) and modified to prevent removal of the silver cladding. The cleaned slides were incubated for 1 hour in a 2% silane solution (1 ml 3-mercaptopropyl triethoxysilane in 50 ml anhydrous toluene) in a glove bag under nitrogen. The slides were washed three times in anhydrous toluene and air-dried briefly on a lint-free cloth, silver side up. The silanized slides were incubated for 30 minutes at room temperature in GMBS solution (12.5 mgB [g-maleimidobutyryloxy]-succinimide ester in 0.25 ml dimethyl sulfoxide to which 43 ml absolute ethanol were added), then washed three times in de-ionized water and placed in a fresh Coplin jar. Finally, the slides were incubated in a NeutrAvidin solution (100 Fg/ml in 10 mM sodium phosphate buffer, pH 7.4) for 2 hours at room temperature, and then rinsed three times in 10 mM sodium phosphate buffer, pH 7.4, prior to storing them in the same buffer.

Physically isolated patterning, PIP, (Rowe, C. A., *Anal. Chem.,* 1999, 71, pp. 433-439 (the disclosure of which is incorporated herein in its entirely by reference)) was used to form an array of recognition elements on a planar waveguide. Briefly, a patterning multi-channel flow cell was placed on the surface of a waveguide that had been coated with NeutrAvidin. Biotinylated anti-SEB antibodies were introduced into the channels of the flow cell (each channel can contain a separate recognition molecule) and incubated overnight at 4° C., producing columns of the capture antibody patterned on the waveguide surface, perpendicular to its length. When used in combination with a multi-channel flow cell aligned orthogonal to the patterned capture antibody, the sensing surfaces present a 2-dimensional array of rectangular recognition elements.

The PIP method used custom designed and molded flow cells, which consisted of six parallel channels fabricated in widths from 0.75 to 1.5 mm. These flow cells were made from MED-6015 silicone elastomer, polydimethylsiloxane, PDMS (NuSil Silicone Technology), an elastomer known for its ability to mold and reproduce three-dimensional structures. PDMS, once cured, is highly inert, i.e., antibodies and antigens are not degraded by exposure to PDMS. In addition, the elasticity and hydrophobicity of PDMS enables temporary, fluid-tight seals to be made using only moderate pressure. The PDMS patterning and assay flow cells were molded from a polymethyl-methacrylate (PMMA) master mold created using a CNC mill (CNC Software Inc., Tolland, Conn.). The PDMS flow cells were reusable. They were cleaned and used to prepare dozens of patterned substrates.

Cube layers were designed using MasterCam 8.0 software (CNC Software Inc., Tolland, Conn.) and were manufactured from 0.25 inch clear cast acrylic (AtoHaas North America, Inc., Philadelphia, Pa.) using a 3-axis servo router (Techno-Isel, Hyde Park, N.Y.). Each layer of acrylic was milled to contain a hole or groove or both. When the layers were aligned, the holes and grooves combined to form a three-dimensional network of channels and reservoirs. The cube was designed to contain a bank of sample reservoirs on one side and reagent reservoirs on the other with channels between the reservoirs. Other features that were milled into the layers formed holes for alignment of the pins and holes that were used to attach the cube to the flow manifold. To form a solid cube, the layers were secured with stainless steel pins then lightly clamped in a vise and heated to 140° C. for 3 hours. After cooling to room temperature, stainless steel tubing was inserted into the twelve exit holes to create exit ports. The tubing was secured with a small amount of 5 Minute® Epoxy (Devcon, Inc., Danvers, Mass.). After the epoxy had set, the tubing was cut to the desired length using a variable-speed rotary tool equipped with a cut-off wheel (Dremel, Inc., Racine, Wis.). Alternatively, the cube was created by applying Weld-On 3, an acrylic solvent cement, (IPS Corporation, Gardena, Calif.) to a layer then carefully placing the next layer on top of it, with light manual pressure and allowing the cement to dry. Layers were built up in this manner until the entire cube was created. After cementing the layers into a cube, it was placed in a vise under light pressure and heated to 140° C. for 3 hours. Each cube was tested for proper fluid flow and also checked for leaks between reservoirs and channels or to the exterior.

A flow manifold containing six channels and entry/exit holes for fluid passage was designed using MasterCam 8.0 software (CNC Software Inc., Tolland, Conn.). The flow manifold was manufactured from 0.25" clear cast acrylic (AtoHaas North America, Inc., Philadelphia, Pa.) or black Lucite7™ clear cast acrylic (IC Acrylics, Wilmington, Del.) using a 3-axis servo router (Techno-Isel, Hyde Park, N.Y.). In the case of the manifold containing the PDMS gasket (Leatzow et al., submitted), the flow channels were 2.74 mm wide×38.1 mm long and 2.54 mm deep. The PDMS barrier separation between each channel measured approximately 1.1 mm.

The flow manifold with the PDMS gasket was attached to the glass waveguide through compression in a cassette assembly. The assembly included the acrylic flow manifold with integrated PDMS gasket, the glass waveguide, a bottom aluminum mounting bracket, and nylon mounting screws. The waveguide was held in place between the flow manifold and the mounting bracket by tightening the mounting screws. The cube was attached to the top of the flow manifold by a pair of nylon mounting screws. The screws extended above the top surface of the manifold and entered into the cube from below.

Following component assembly, the assay module (cube, flow manifold, and waveguide) was placed on the detector. To verify the system=s integrity and block nonspecific binding, the cube=s reservoirs were filled with phosphate buffer saline containing 0.05% Triton® and 1 mg/ml bovine serum albumin, PBSTB, which was drawn through the flow manifold with negative pressure from a downstream peristaltic pump. During the PBSTB flow-through, images of the waveguide were captured to check for flow and leaks. To assess nonspecific binding, 200 μl of 10 μg/ml Cy5-anti-SEB antibody solutions were loaded into one bank of reservoirs and drawn through the system. The system was flushed with 250 μl of PBSTB per reservoir and an image was captured. The image showed negligible binding of Cy5-anti-SEB antibody to the waveguide or to the edges of the flow manifold touching the waveguide.

Once the system checks were completed, 250 μl of each dilution of SEB (0-50 ng/ml) were loaded into one bank of sample reservoirs. The other bank of reservoirs was loaded with 250 μl Cy5-anti-SEB, fluorescent tracer antibody, at 10

μg/ml. By opening and closing the appropriate air vents, the reservoirs containing the tracer antibodies could be closed and the reservoirs containing the samples could be opened, allowing only the sample reservoirs to flow. An off-board peristaltic pump at a flow rate of approximately 0.35 ml/min was used to create negative pressure downstream of the assay module. After five minutes, the sample reservoirs had been drained and the vents were then closed. The tracer antibody reservoirs were then opened, and flow was confirmed by capturing an image during the flow-through. After five minutes, the antibody reservoirs had been drained. The antibody reservoirs were filled with PBSTB and the buffer flushed through the flow manifold. A final image, demonstrating detection of various concentrations of SEB was captured and analyzed.

Digitized images were analyzed using Scion Image (Scion Corporation, Frederick, Md.). To quantitate a region of interest ("spot"), a small rectangular selection was outlined around it and the program calculated the average intensity of the pixels within the spot. Using the same size rectangle, background readings were taken on either side of the spot and the mean fluorescence of the background was subtracted from the value determined for the spot. There were six spots per channel (per SEB concentration) and their mean and standard deviations were reported.

Premature mixing of sample and reagent upstream of the waveguide surface could be minimized by configuring the flow path so that neither the sample nor the reagent flowed through the common channel, i.e., by separating the fluids with an extended barrier.

Dilutions of SEB were loaded into the reservoirs of the cube and assayed in our detector system. FIG. 9 shows the pattern of signals captured by the imaging system. The fluorescent signals of the spots were determined by subtracting the mean fluorescent intensity of the adjacent regions with no capture antibody (non-specific binding) from the fluorescent intensity of the region including the capture antibody. The net fluorescence for each capture antibody spot was plotted as a function of SEB concentration. As shown in FIG. 10, the system was able to detect concentrations of SEB from 5 to 50 ng/ml in a 200 μl sample, i.e., 1 to 10 ng (36-360 fmoles) of SEB. Six samples were analyzed simultaneously with six assay replicates of each sample (i.e., six separate assay spots) in under 20 minutes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fluidics system, comprising:

a primary fluid channel comprising an input and an output;

an enclosed first reservoir connected to said primary fluid channel input and comprising a first adjustable vent;

an enclosed second reservoir connected to said primary fluid channel input and comprising a second adjustable vent;

a negative pressure source connected to said primary fluid channel output;

an auxiliary fluid reservoir and a connection valve, wherein the auxiliary fluid reservoir is connected in series through the connection valve to an auxiliary input of at least one of the first and second reservoirs; and the system is configured to selectively draw fluid from the auxiliary fluid reservoir into at least one of the first and second reservoirs when the negative pressure source is activated, the connection valve is open, and the respective reservoir is not vented to a pressure source having a pressure less than a pressure of the negative pressure source;

wherein the fluidics system is configured to selectively draw at least one fluid from at least one of the first and second reservoirs into the primary fluid channel when the negative pressure source is activated and the respective reservoir is unsealed.

2. The fluidics system of claim 1, further comprising:

an analytical device associated with said primary fluid channel.

3. The fluidics system of claim 1, wherein said primary fluid channel is at least 10% larger in cross section than any particle in said first and second fluids.

4. The fluidics system of claim 1, further comprising:

more than one secondary fluid channel configured parallel and/or serial to each other.

5. The fluidics system of claim 4, further comprising:

more than one negative pressure source downstream of said secondary fluid channels.

6. The fluidics system of claim 4, further comprising:

a manifold connecting said secondary fluid channels to said negative pressure source.

7. The fluidics system of claim 1, wherein said first reservoir comprises more than one chamber.

8. The fluidics system of claim 1, further comprising:

a valve associated with said first vent; and a valve associated with said second vent.

9. The fluidics system of claim 1, further comprising:

a second primary fluid channel; and a second manifold connecting said primary fluid channels to said negative pressure source downstream of said primary fluid channels.

10. The fluidics system of claim 1, further comprising:

a waveguide for surface-sensitive optical detection of an analyte in said first or second fluid.

11. The fluidics system of claim 10, further comprising:

a waveguide sensing system;

wherein said waveguide sensing system comprises:

a plurality of waveguides;

wherein each of said waveguides has a first surface, a second surface opposing said first surface, and an end surface essentially perpendicular to said first and second surfaces, and wherein said first surface of each of said waveguides has an analyte recognition element thereon;

a waveguide holder to which each of said waveguides is secured; and an optical detector positioned opposite said end surface of at least one of said waveguides.

12. The fluidics system of claim 11, wherein said first and second vents are adjustable so that first and second fluids from said first and second reservoirs, respectively, move at a first and a second flow rate to said primary fluid channel; and wherein a different between said first and second flow rates is proportional to a difference in adjustments of said first and second vents.

13. The fluidics system of claim 1, wherein first or second fluid moves from said first or second reservoirs, respectively, at a first and second flow rate, wherein a difference between said first and second flow rates if proportional to a differential fluid flow resistance, and wherein said differential fluid flow resistance is adjusted by said first and second fluid vents.

14. The fluidics system of claim 1, wherein said primary fluid channel has a cross section greater than 1 micron.

15. The fluidics system of claim 1, wherein said system is a portable analysis system configured to perform at least one of a biological and chemical analysis.

16. The system of claim 1, wherein the system is configured such that fluid does not flow from said reservoirs into said primary fluid channel unless both said negative pressure source is activated and said at least one reservoir is unsealed.

17. The system of claim 1, wherein the system further comprises a system relief vent connected to said primary flow channel, said system relief vent being configured to seal and unseal said primary flow channel from contact with an external atmosphere.

* * * * *